US009238501B1

(12) United States Patent  
Shen et al.

(10) Patent No.: US 9,238,501 B1  
(45) Date of Patent: Jan. 19, 2016

(54) BILGE KEEL WITH POROUS LEADING EDGE

(71) Applicants: Young T. Shen, Potomac, MD (US); Michael J. Hughes, Vienna, VA (US)

(72) Inventors: Young T. Shen, Potomac, MD (US); Michael J. Hughes, Vienna, VA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 21 days.

(21) Appl. No.: 14/109,515

(22) Filed: Dec. 17, 2013

(51) Int. Cl.
 *B63B 3/44* (2006.01)
 *B63B 39/06* (2006.01)
 *B63B 3/38* (2006.01)

(52) U.S. Cl.
 CPC . *B63B 39/06* (2013.01); *B63B 3/38* (2013.01); *B63B 2003/385* (2013.01); *B63B 2039/067* (2013.01)

(58) Field of Classification Search
 CPC ............... B63B 2003/385; B63B 3/44; B63B 2039/067

USPC ............................. 114/140–143, 145 R, 126  
See application file for complete search history.

(56) References Cited

U.S. PATENT DOCUMENTS

| 2,033,165 | A | * | 3/1936 | Williams | 367/174 |
| 6,176,191 | B1 | * | 1/2001 | Fernandes et al. | 114/142 |
| 7,637,462 | B2 | | 12/2009 | Pal | |
| 2011/0126750 | A1 | * | 6/2011 | Leverette | 114/265 |
| 2013/0098281 | A1 | * | 4/2013 | Ando | B63B 39/06 114/126 |

OTHER PUBLICATIONS

Soogab Lee, Reduction of Blade-Vortex Interaction Noise Through Porous Leading Edge, AIAA Journal, vol. 32, No. 3, Mar. 1994. USA.

* cited by examiner

*Primary Examiner* — S. Joseph Morano  
*Assistant Examiner* — Andrew Polay  
(74) *Attorney, Agent, or Firm* — Dave A. Ghatt

(57) ABSTRACT

A bilge keel design for improved ship roll damping performance. The bilge keel has a porous region substantially at a forward end, and is designed to alleviate and mitigate added drag from flow misalignment due to scale effects and variation in vessel speed and loading conditions. The bilge keel design is use on both port and starboard sides of the vessel hull.

15 Claims, 3 Drawing Sheets

BILGE KEEL WITH POROUS LEADING EDGE

STATEMENT OF GOVERNMENT INTEREST

The following description was made in the performance of official duties by employees of the Department of the Navy, and, thus the claimed invention may be manufactured, used, licensed by or for the United States Government for governmental purposes without the payment of any royalties thereon.

TECHNICAL FIELD

The following description relates generally to a bilge keel design for improved ship roll damping performance. More particularly, the invention is directed to a bilge keel with a porous region substantially at a forward end.

BACKGROUND

Since the mid-1800s, ships have used bilge keels to mitigate roll motions due to waves. The use of bilge keels to minimize ship roll motion was first suggested by Froude. Historically, bilge keels have featured flat plate designs, and later also included discontinuous fin or wedge type designs along the ship's length. Conventional bilge keels are used to mitigate and dampen small to moderate roll motions.

A bilge keel is a projection like a fin extending from the fore to the rear part of the hull around the turn of the bilge on both sides of the ship. Bilge keels should be situated so that they do not strike the wharf or another vessel when tying alongside. Bilge keels are usually constructed from flat plates the form a sharp obstruction to the roll motion. The bilge keel itself should be aligned with the flow streamline of the moving ship so that its effect on the resistance is minimal.

The alignment can be determined by an oil dot flow technique during the initial resistance experiments. Visualization studies can be performed with tuffs placed on the hull surface during the resistance tests to aid and confirm the adequacy of the bilge keel alignment. The bilge keel alignment test is typically conducted at the ship design speed and a design craft displacement with the model tested in Froude scale.

A moving ship will induce a boundary layer along the hull surface. The boundary layer velocity profiles are sensitive to Reynolds scale. By testing a model in Froude scale, the Reynolds numbers can differ by two orders of magnitude between ship and model. The streamline orientation can differ noticeably between full-scale and model-scale due to large difference in Reynolds number. Bilge keels that are carefully aligned with streamlines during the model tests may experience an angle of attack on the full-scale vessel due to difference in boundary layer profiles along the ship hulls. The misalignment in flow field and bilge keel placement will induce added drag on bilge keels.

Similarly, craft displacement may change over the life of the vessel or even change during missions as fuel is consumed during the voyage. The distribution of weight on the vessel may also change. The change in displacement and weight distribution will change the craft sinkage and trim, which will shift the flow patterns around the hull and change the flow into the bilge keels. An added drag on bilge keels is induced by the misalignment of the flow direction with the bilge keel orientation. The same comments on Reynolds number effects are applicable to the effects of ship speed changes. In addition to the design speed, a ship is often operated at different ship speeds for different mission requirements. The change in ship speeds can change ship trim angle and flow streamline orientation, which can lead to an increase in the added drag on the bilge keels. It is desired to have a simple and effective bilge keel design with enhanced roll stabilization that alleviates added bilge keel drag, and reduces fuel cost due to changes in craft loading condition, ship speed, and Reynolds scale effects on boundary layer velocity profiles as described above, and generally accommodates for changing environmental conditions.

SUMMARY

In one aspect, the invention is a ship with enhanced roll stabilization that accommodates for changing conditions. The ship includes a hull having, a bow end, a stem end, a port side, and a starboard side. The ship also includes a waterline region along the hull representing a region of possible waterlines on the hull. In this aspect, the invention also has first and second bilge keels mounted along the hull within or below the waterline region, wherein the first bilge keel is positioned on the port side of the hull, and the second bilge keel is positioned on the starboard side of the hull. Each of the first and the second bilge keels has an elongated plate having an attachment end attached to the hull, and a free end. The elongated plate also has a forward end with a leading edge attached at the bow end of the hull, the forward end extending laterally from the attachment end to the free end, and a trailing end attached towards the rear of the hull, the trailing end extending laterally from the attachment end to the free end. In this aspect, the elongated plate is substantially non-porous with a porous region substantially at the forward end.

In another aspect, the invention is a bilge keel that accommodates for changing conditions. The bilge keel has an elongated plate having an attachment end for attaching the bilge keel to a side of a hull, and a free end extending away from the hull. The elongated plate also has a forward end with a leading edge for attachment at the bow end of the hull, the forward end extending laterally from the attachment end to the free end. The elongated plate also has a trailing end for attachment toward the rear of the hull, the trailing end extending laterally from the attachment end to the free end, wherein the elongated plate is substantially non-porous with a porous region substantially at the forward end.

BRIEF DESCRIPTION OF THE DRAWINGS

Other features will be apparent from the description, the drawings, and the claims.

DETAILED DESCRIPTION

Figure 1A:
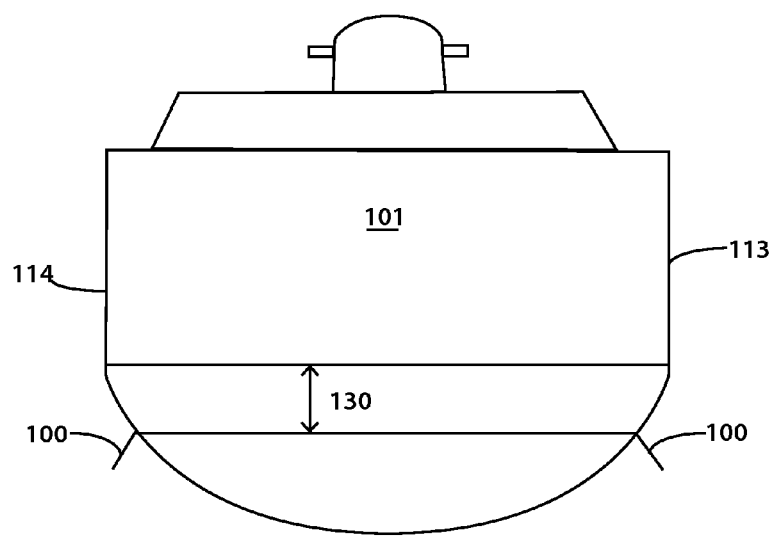
FIG. 1A is an exemplary front view of a ship with enhanced roll stabilization that accommodates for changing conditions, according to an embodiment of the invention.
Figure 1B:
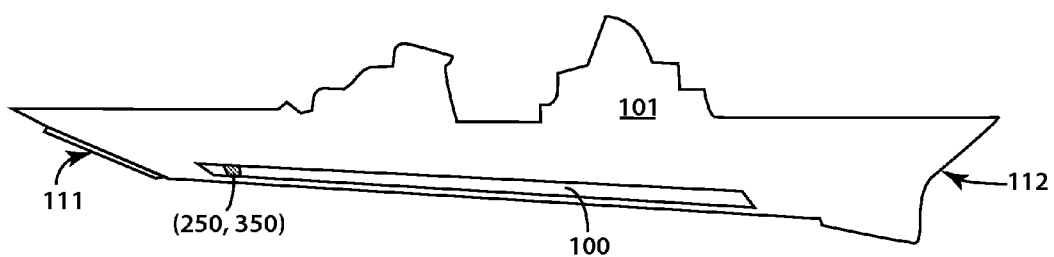
FIG. 1B is an exemplary side view of a ship with enhanced roll stabilization that accommodates for changing conditions, according to an embodiment of the invention.

FIGS. 1A and 1B are exemplary sectional illustrations of a ship hull 101 with enhanced roll stabilization that accommodates for changing conditions, according to an embodiment of the invention. The ship may be any type of ship, such as a commercial or noncommercial cargo ship, a cruise ship, a naval ship, or a smaller ship. The hull 101 includes a propulsion system commensurate with the type of ship. For example, the hull 101 may include propulsors that provide thrusting forces based on the rotation of propellers, or the ship may be propelled by waterjets discharged into the air above the water surface. The propulsors may propel the ship 101 at any desired speed, including speeds of up to 40 knots and more.

FIGS. 1A and 1B show the hull 101 having a bow end 111, a stern end 112, a port side 113, and a starboard side 114. FIG. 1A shows two bilge keels 100 attached to the hull 101. A first bilge keel 100 is attached to a port side 113 of the hull 101, and a second bilge keel 100 is attached to a starboard side 114. As outlined below, the bilge keels 100 are provided to accommodate for changing environmental conditions. As outlined below, according to the invention, the bilge keels 100 each have a porous leading end portion that facilitates increased stability, alleviates added bilge keel drag, and reduces fuel cost due to changes in craft loading condition, ship speed, and Reynolds scale effects on boundary layer velocity profiles. As shown in FIGS. 1A and 1B, the hull 101 includes a waterline region 130 that represents the region of possible waterlines on the hull. Each bilge keel 100 is positioned within or below the waterline region 130. The bilge keel 100 may be fabricated using metals such as steel, composites, and the like.

Figure 2A:
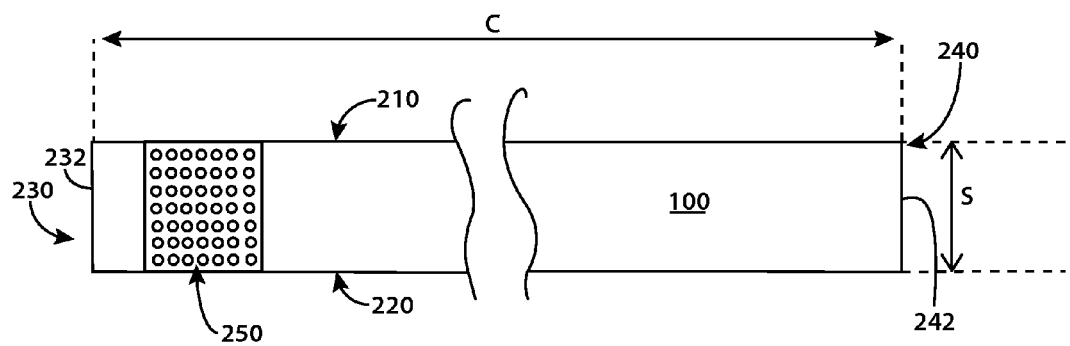
FIG. 2A is an exemplary illustration of an advanced bilge keel that accommodates for changing conditions, according to an embodiment of the invention.

FIG. 2A is an exemplary illustration of a bilge keel 100 that accommodates for changing conditions, according to an embodiment of the invention. As outlined below, the keel 100 is designed to alleviate and mitigate added drag from flow misalignment due to scale effects and variation in vessel speed and loading conditions. The keel 100 shown in FIG. 2A is a rectangular keel with a porous arrangement. The rectangular keel 100 according to the embodiment of FIG. 2A, may be used as both the port side and starboard keels. The keel 100 may be an elongated plate that is fabricated using metals such as steel, composites, and the like. As shown, the keel 100 has an attachment end 210, which is the portion of the elongated plate that is attached to a side of a hull at either the portside 113 or the starboard side 114 of the hull 101. FIG. 2A also shows a free end 220, which when attached to a ship, extends away from the hull 101. FIG. 2A shows the keel 100 having a forward end 230. When the bilge keel 100 is attached to the hull, the forward end 230 is attached at the bow end 111 of the hull 101. The forward end 230 has a leading edge 232. FIG. 2A also shows the trailing end 240 with a rear edge 242. As shown in the side view of FIG. 2A, the trailing end 240 of the bilge keel 100 is attached towards the rear of the hull. Depending on the embodiment, the trailing end 240 may extend closer to the stem 112. As shown, the bilge keel 100 includes a porous region 250, substantially at the forward end 230. Because the bilge keel 100 of FIG. 2A is rectangular, each of the leading edge 232 and the rear edge 242 extend substantially perpendicular to each of the attachment end 210 and the free end 220.

FIG. 2A shows the bilge keel 100 having a span S and a chord length C. FIG. 2A includes a break in the middle of the keel 100 and thus does not accurately represent the dimensional relationship between the span S and the chord length C. In actuality, the bilge keel 100 is very long and the span S is much smaller than the chord length C (S<<C). Consequently as outlined below, the bilge keel can be treated as a very low aspect ratio wing. As outlined below, during ship operations, the flow approaches the bilge keel 100 at an angle of attack caused by flow misalignment. Because of the flow misalignment, there is an induced resulting normal force. Due to the dimensions of the bilge keel 100 according to the instant invention, particularly due to the very low aspect ratio, the normal force will occur at the forward end 230, in an area at about 1% to about 3% of the chord C from the leading edge 232. To alleviate against the drag at the forward end 230, the porous portion 250 is positioned as shown in FIG. 2A described above, and as shown in FIG. 2B, described below.

Figure 2B:
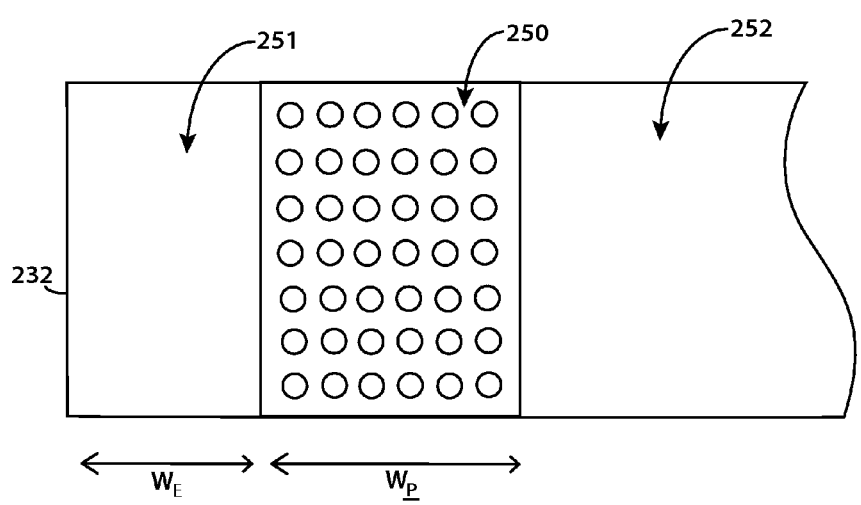
FIG. 2B is an exemplary sectional illustration of an advanced bilge keel, according to an embodiment of the invention.

FIG. 2B is an exemplary illustration of the forward end of the bilge keel 100, according to an embodiment of the invention. As shown the forward end 230 has a leading edge 232. As shown, the leading edge 232 is substantially straight and extends substantially perpendicularly from the attachment end 210 to the free end 220. FIG. 2l3 also shows the forward end 230 having a non-porous portion 251 at the leading edge 232, which is adjacent to the porous portion 250. The porous portion 250 is sandwiched between the non-porous portion 251 and another non-porous portion 252, which is essentially the remainder of the bilge keel 100.

As outlined above, during operation the bilge keel 100 is dimensioned so that the normal force will occur at the forward end 230, in an area at about 1% to about 3% of the chord C from the leading edge 232. To alleviate against the drag at the forward end 230, the porous portion 250 is positioned in the region where this force occurs, i.e., at a distance $W_E$ from the leading edge 232, which is about 0.01 C to about 0.02 C. As outlined above, C is the chord length. It should be noted that the distance $W_E$ is also the width of the non-porous portion 251. As shown in FIG. 2B, the porous portion 250 has a width $W_P$, which may be about 0.02 C to about 0.03 C. According to an embodiment of the invention, $W_E$ is about 0.01 C and $W_P$ is about 0.02 C.

Figure 3A:
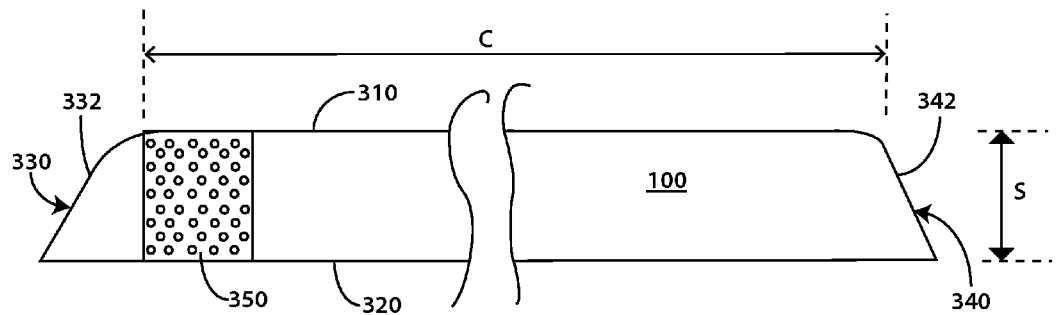
FIG. 3A is an exemplary illustration of an advanced bilge keel that accommodates for changing conditions, according to an embodiment of the invention.

FIG. 3A is an exemplary illustration of an advanced bilge keel 100 that accommodates for changing conditions, according to an embodiment of the invention. As outlined below, the keel 100 is designed to alleviate and mitigate added drag from flow misalignment due to scale effects and variation in vessel speed and loading conditions. The keel 100 shown in FIG. 3A is a tapered keel with a porous arrangement. The tapered keel 100 according to the embodiment of FIG. 3A, may be used as both the port side and starboard keels. But for the tapered edges (outlined below), the keel 100 of FIG. 3A is similar to that of FIG. 2A, and thus may also be an elongated plate that is fabricated using metals such as steel, composites, and the like.

As shown in FIG. 3A, the keel 100 has an attachment end 310, which is the portion of the elongated plate that is attached to a side of a hull at either the portside 113 or the starboard side 114 of the hull 101. FIG. 3A also shows a free end 320, which when attached to a ship, extends away from the hull 101. FIG. 3A shows the keel 100 having a forward end 330. When the bilge keel 100 is attached to the hull, the forward end 330 is attached at the bow end 111 of the hull 101. The forward end 330 has a leading edge 332. FIG. 3A also shows the trailing end 340 with a rear edge 342. As shown, the bilge keel 100 includes a porous region 350, substantially at the forward end 330. Because the bilge keel 100 of FIG. 3A is tapered, each of the leading edge 332 and the rear edge 342 are tapered, so that when viewed they are mirror images of each other. Similar to FIG. 2A, FIG. 3A shows the bilge keel 100 having a span S and a chord length C, in which the span S is much smaller than the chord length C(S<<C). Similar to the rectangular bilge keel 100 embodiment shown in FIGS. 2A and 2B, the tapered bilge keel 100 is dimensioned so that during operation the normal force will occur at the forward end 330, in an area at about 1% to about 3% of the chord C from the leading edge 332.

FIG. 313 is an exemplary illustration of the forward end 330 of an advanced bilge keel 100 shown in FIG. 3A, according to an embodiment of the invention. As shown the forward end 330 has a leading edge 332. As shown, the leading edge 332 extends diagonally (diagonal portion 335) from the attachment end 310 to the free end 320 with a curved end portion 337 forming a tapered leading edge. FIG. 313 also shows the forward end 330 having a non-porous portion 351 at the leading edge 332, which is adjacent to the porous portion 350. The porous portion 350 is sandwiched between the non-porous portion 351 and another non-porous portion 352, which is essentially the remainder of the bilge keel 100.

Figure 3B:
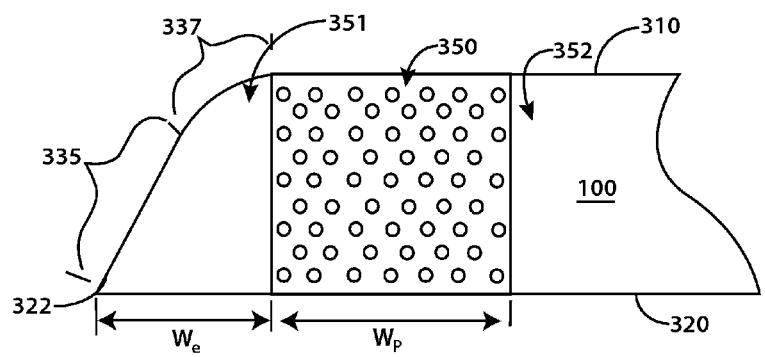
FIG. 3B is an exemplary sectional illustration of an advanced bilge keel, according to an embodiment of the invention.

As outlined above, during operation the bilge keel 100 is dimensioned so that the normal force will occur at the forward end 330, in an area at about 1% to about 3% of the chord C from the leading edge 332. To alleviate against the drag at the forward end 330, the porous portion 350 is positioned where this force occurs, i.e., at a distance $W_e$ from the leading edge 332, which is about 0.01 C to about 0.02 C. As outlined above, C is the chord length. As shown in FIG. 3B, the porous portion 350 has a width $W_p$, which may be about 0.02 C to about 0.03 C. According to an embodiment of the invention, $W_e$ is about 0.01 C and $W_p$ is about 0.02 C.

Figure 4:
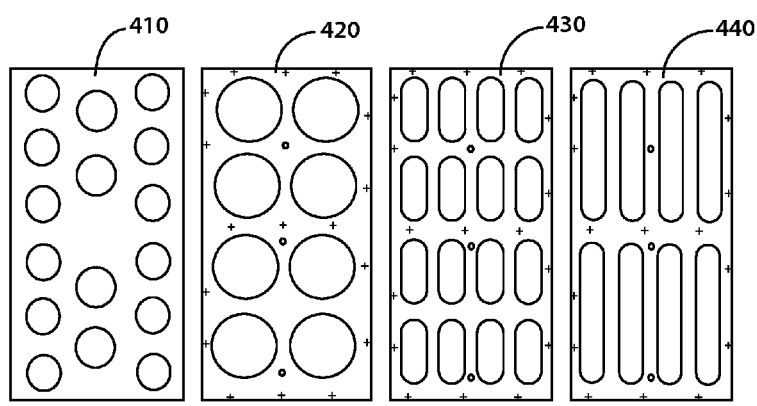
FIG. 4 is an exemplary illustration of different possible hole-pattern configurations for the porous portion, according to embodiments of the invention.

FIG. 4 is an exemplary illustration of different possible hole patterns for the porous portion (250, 350), according to embodiments of the invention. FIG. 4 shows hole patterns 410, 420, 430, and 440. Patterns 410 and 421 have circular holes, and patterns 430 and 440 have elongated slots. As shown, the holes may be small or large. For example, the circular holes of pattern 420 are larger than the circular holes of pattern 410. Any of the hole patterns 410, 420, 430, or 440 may be used in the porous portions 250 and 350 shown in FIGS. 2A and 2B, and FIGS. 3A and 3B, respectively. In addition to circles and slots shown, other ventilation shapes may be used for the porous portions (250, 350) to effectively provide drag mitigation.

The porous portions (250, 350) may have a porosity of about 10% to about 40%. Porosities of about 10% to about 40% are effective diminishing the effects of tip vortex cavitation which produces normal forces around the porous areas (250, 350) of the respective bilge keels 100. In fact, the reduction of vortex strength is maximized at about 20% porosity, but is effective throughout the 10% to 40% porosity range. However, as the porosity increases, the structural integrity of the bilge keel 100 decreases, so for minimal impact on structural integrity, a porosity of about 10% to about 20% is preferred.

According to a preferred embodiment, the bilge keel 100 shown in FIGS. 2A and 2B is used. The porous portion 250 has a circular hole pattern 410 as shown in FIG. 4, with each ventilation hole having a diameter D of 0.5 inches. The total bilge keel area A=S×C, where S is the bilge keel span and C is the chord length. According to this embodiment, the width $W_P$ of the porous portion is 0.02 C where C is the chord length. Also according to this embodiment, the porosity is 10%. The number of ventilation holes N is estimated by:

$$(N)(\pi/4)(D^2)(0.1)(0.02SC)=0.002SC$$

The bilge keel is about one third the length of the ship. According to this embodiment, the ship is about 450 ft, long. Thus the bilge keel chord is about 150 ft. and the span S is 3 ft. According to this embodiment:

$$N=(0.002SC)(4/\pi)/D^2=660$$

As outlined in the above example, for a given bilge keel span S and chord length C and ventilation hole size, the number of ventilation holes to be used for improved drag reduction can be estimated from the above equation, as shown for this exemplary embodiment. However, it should be noted that the values outlined above are directed to only one particular example. Other examples, with alternative ship sizes, spans, chord lengths, hole sizes, and porosities may be applied to match at-sea conditions and requirements.

What has been described and illustrated herein are preferred embodiments of the invention along with some variations. The terms, descriptions and figures used herein are set forth by way of illustration only and are not meant as limitations. Those skilled in the art will recognize that many variations are possible within the spirit and scope of the invention, which is intended to be defined by the following claims and their equivalents, in which all terms are meant in their broadest reasonable sense unless otherwise indicated.

What is claimed is:

1. A ship with enhanced roll stabilization that accommodates for changing conditions comprising:
   a hull having;
      a bow end,
      a stern end,
      a port side, and
      a starboard side,
   a waterline region along the hull representing a region of possible waterlines on the hull;
   first and second bilge keels mounted along the hull within or below the waterline region, wherein the first bilge keel is positioned on the port side of the hull, and the second bilge keel is positioned on the starboard side of the hull, wherein each of the first and the second bilge keels comprise:
      an elongated plate comprising;
         an attachment end attached to the hull;
         a free end;
         a forward end having a leading edge, the forward end attached at the bow end of the hull, the forward end extending laterally from the attachment end to the free end; and
         a trailing end having a rear edge, the trailing end attached towards the rear of the hull, the trailing end extending laterally from the attachment end to the free end, wherein the elongated plate comprises a porous portion extending laterally from the attachment end to the free end, said porous portion substantially at the forward end, and wherein the remainder of the elongated plate in a direction extending from said porous portion towards the rear edge is non-porous.

2. The ship with enhanced roll stabilization of claim 1, wherein each of the first and second bilge keels have a chord length C, and wherein each forward end comprises a non-porous portion at the leading edge which is adjacent to said porous portion, wherein said non-porous portion has a width of about 0.01 C to about 0.02 C, and said porous portion has a width of about 0.02 C to about 0.03 C.

3. The ship with enhanced roll stabilization of claim 2, wherein said porous portion is about 10% to about 40% porous.

4. The ship with enhanced roll stabilization of claim 3, wherein said porous portion has circular holes therein.

5. The ship with enhanced roll stabilization of claim 4, wherein said non-porous portion at the leading edge has a width of about 0.01 C, and said porous portion has a width of about 0.02 C.

6. The ship with enhanced roll stabilization of claim 5, wherein the leading edge is substantially straight and extends substantially perpendicularly from the attachment end to the free end.

7. The ship with enhanced roll stabilization of claim 5, wherein the leading edge extends diagonally from the attachment end to the free end with a curved end portion forming a tapered leading edge.

8. A bilge keel that accommodates for changing conditions, the bilge keel comprising:
   an elongated plate comprising:
      an attachment end for attaching the bilge keel to a side of a hull;
      a free end extending away from the hull;
      a forward end having a leading edge, the forward end for attachment at the bow end of the hull, the forward end extending laterally from the attachment end to the free end; and
      a trailing end having a rear edge, the trailing end for attachment toward the rear of the hull, the trailing end extending laterally from the attachment end to the free end, wherein the elongated plate comprises a porous region portion extending laterally from the attachment end to the free end, said porous portion substantially at the forward end and wherein the remainder of the elongated plate in a direction extending from said porous portion towards the rear edge is non-porous.

9. The bilge keel of claim 8, wherein the bilge keel has a chord length C, and wherein the forward end comprises a non-porous portion at the leading edge, which is adjacent to porous portion, wherein said non-porous portion has a width of about 0.01 C to about 0.02 C, and said porous portion has a width of about 0.02 C to about 0.03 C.

10. The bilge keel of claim 9, wherein said porous portion is about 10% to about 40% porous.

11. The bilge keel of claim 10, wherein said non-porous portion has a width of about 0.01 C, and the porous portion has a width of about 0.02 C.

12. The bilge keel of claim 11, wherein said porous portion has circular holes therein.

13. The bilge keel of claim 12, wherein said porous portion is about 10% porous.

14. The ship with enhanced roll stabilization of claim 4, wherein the leading edge is substantially straight and extends substantially perpendicularly from the attachment end to the free end.

15. The bilge keel of claim 13, wherein the leading edge extends diagonally from the attachment end to the free end with a curved end portion forming a tapered leading edge.

\* \* \* \* \*